United States Patent [19]

Nassauer

[11] Patent Number: 4,527,761
[45] Date of Patent: Jul. 9, 1985

[54] DEVICE FOR THE SUPPORTING OF HORIZONTAL, THERMALLY LOADED CONTAINERS

[75] Inventor: Konrad Nassauer, Berlin, Fed. Rep. of Germany

[73] Assignee: Borsig GmbH, Berlin, Fed. Rep. of Germany

[21] Appl. No.: 565,596

[22] Filed: Dec. 27, 1983

[30] Foreign Application Priority Data

Feb. 4, 1983 [DE] Fed. Rep. of Germany ....... 3303752

[51] Int. Cl.³ ............................................. F22B 37/24
[52] U.S. Cl. .............................. 248/128; 248/DIG. 1; 165/81
[58] Field of Search ............... 248/128, 662, 130, 660, 248/663, 550, 664, 666, DIG. 1; 165/67, 82, 81

[56] References Cited

U.S. PATENT DOCUMENTS

| | | | |
|---|---|---|---|
| 2,475,109 | 7/1949 | Pendleton | 248/DIG. 1 |
| 3,771,499 | 11/1973 | Marroni | 248/DIG. 1 |
| 3,927,714 | 12/1975 | Stogmuller | 165/82 |
| 4,050,660 | 9/1977 | Eggmann | 248/DIG. 1 |
| 4,101,288 | 7/1978 | Smith | 248/DIG. 1 |
| 4,355,780 | 10/1982 | Bridgnell | 248/DIG. 1 |

*Primary Examiner*—Reinaldo P. Machado
*Assistant Examiner*—Alvin Chin-Shue
*Attorney, Agent, or Firm*—Max Fogiel

[57] ABSTRACT

A thermally loaded container is supported by way of support brackets on two bearings arranged at a spacing from each other. In order to permit a length change caused by temperature in horizontal direction and a raising in vertical direction, the brackets in one bearing are guided to be displaceable vertically and horizontally. The other bearing consists of hinged supports which are inclined relative to the longitudinal axis of the container and pivotable in direction of the longitudinal axis of the container.

4 Claims, 2 Drawing Figures

DEVICE FOR THE SUPPORTING OF HORIZONTAL, THERMALLY LOADED CONTAINERS

BACKGROUND OF THE INVENTION

The present invention concerns a device for the supporting of horizontal, thermally loaded containers which rest through support brackets on two bearings arranged at a spacing from each other.

Containers of this species can, for example, be waste heat tanks, the heat exchanger tube bundles of which are surrounded by a pressure shell. In order to be able to absorb the length changes arising on temperature changes, these containers can be slidingly borne and, for example, rest on rollers or slide bearings. Only horizontal movements can be absorbed by way of such a bearing. In other cases, a possibility of movement also in vertical direction must be permitted in addition to the horizontal movement. This is required for example when the waste heat tank is connected to the connecting stub of a reactor, and this connecting stub displaces in the height position during a different heat loading of the reactor and wanders by a certain amount in vertical direction. The connection between the connecting stub of the reactor and the waste heat tank would be too strongly loaded mechanically through this vertical wandering.

SUMMARY OF THE INVENTION

The present invention is based on the task of supporting a horizontal, thermally loaded container connected with a vertical connecting stub, so that it can follow a movement in vertical direction without mechanical overloading of the stub connection.

In the container according to the invention, the length change caused by temperature effects a change in the inclination of the hinged supports and thereby constrainedly a vertical movement of the container. The inclination of the hinged supports is chosen so that the maximally arising vertical movement of the connecting stub is attained on the maximum length expansion of the container.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
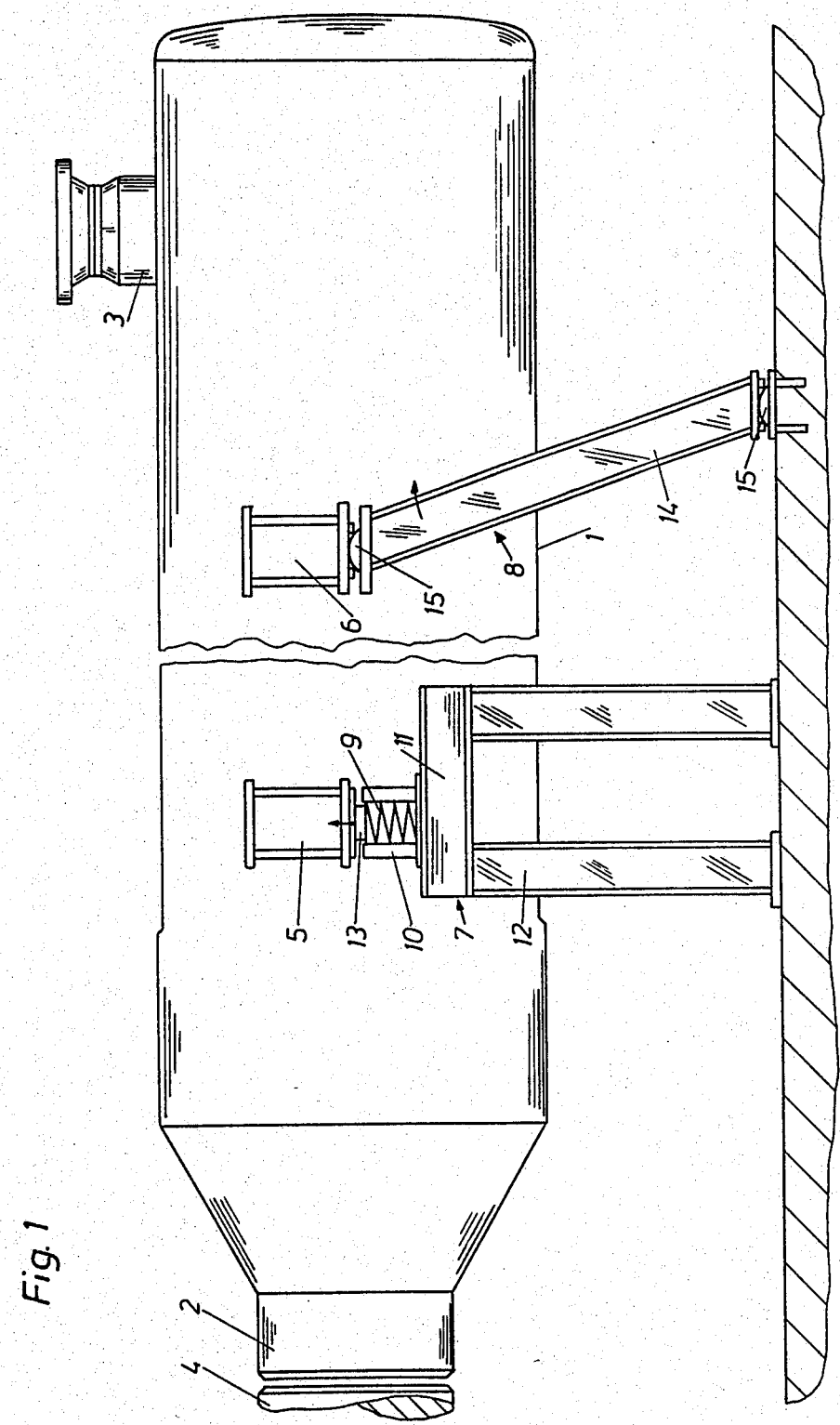
FIG. 1 shows a side elevation of a container according to the present invention.

A waste heat tank, which has a pressure-tight shell 1, is illustrated as a container. Heat exchanger tubes, which are flowed through by a heat exchange medium, for example hot gas, are arranged within the shell 1 in the well-known manner. The waste heat tank is provided with an entry stub 2 for the entry of the hot gas to be cooled and with an exit stub 3 for the exit of the cooled gas.

The entry stub 2 of the waste heat tank is connected to a stub 4 of a reactor. This stub 4 can be subject to an upwardly directly movement on a thermal loading of the reactor. In order that the welded seam, which represents the connection between the stub 4 of the reactor and the entry stub 2 of the waste heat tank, is not subject to any mechanical stress during this vertical movement, the waste heat tank must be able to execute the same vertical movement. For this purpose, the waste heat tank is supported as described in the following.

The waste heat tank is provided with two pairs of support brackets 5 and 6, which are welded to the shell 1. The support brackets 5 and 6 rest on two bearings 7 and 8, which are arranged at a spacing each from the other to both sides of the shell 1 and supported on a foundation.

The bearing 7, lying nearest to the entry stub 2, comprises biassed springs 9, which are retained between two lateral guides 10. The lateral guides 10 are borne slidingly in horizontal direction on a transverse carrier 11, which bridges over two vertical supports 12.

The spring 9 presses against a plate 13, which is provided under the end face of the hinged support 5 and engages into the lateral guides 10. The bias of the springs 9 is greater than the proportion of the weight of the waste heat tank acting on the bearing 7 so that an upwardly directed force exists.

The bearing 8 remote from the entry stub 2 consists of a respective hinged support 14 arranged to both sides of the shell. The hinged supports 14 at both their ends have joints 15, of which one is provided on the foundation and the other rests against the support bracket 6. The hinged supports 14 are inclined relative to the longitudinal axis of the shell 1 in direction towards the entry stub 2. The hinged supports 14 can be pivoted in longitudinal direction of the shell.

Figure 2:
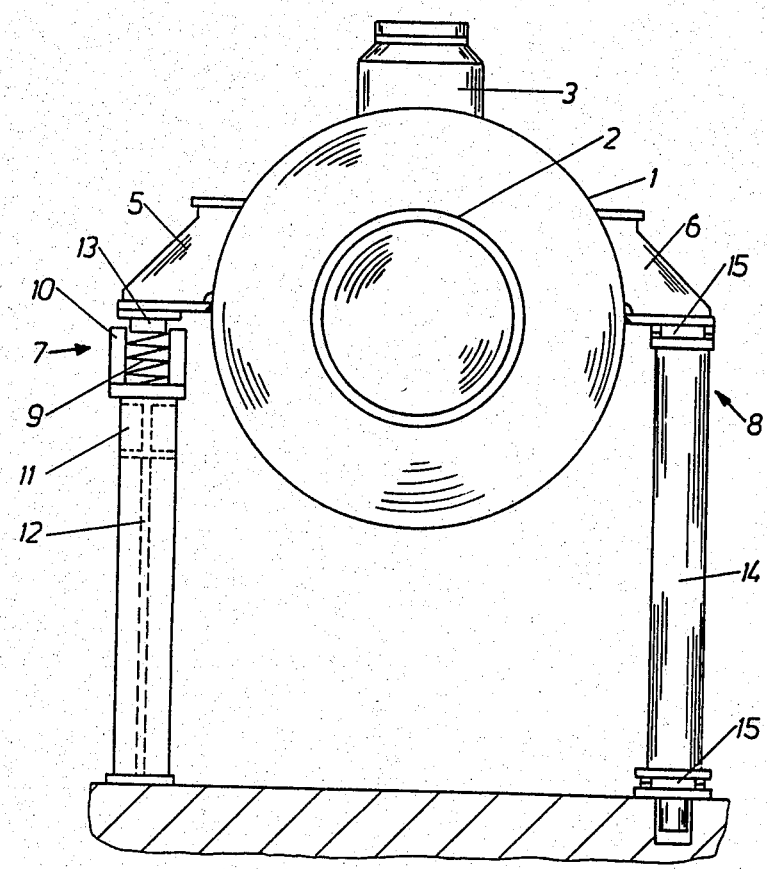
FIG. 2 shows a front elevation of the arrangement of FIG. 1.

The bearing 7 with the spring 9 is illustrated to the left and the bearing 8 consisting of the hinged support 14 is illustrated to the right in FIG. 2 only for the purpose of aiding in the explanation of the invention. The bearing 7 as well as also the bearing 8 are, of course, each provided to both sides of the shell 1.

On putting the waste heat tank into operation, the shell 1 expands in only one direction, since it is held at the entry stub 2. Through the length expansion directed towards the right on the drawing, the hinged supports 14 raise up and move the support brackets 6 on an upwardly directed circular path. The inclination of the support brackets in the initial state is so fixed that the same raising as at the entry stub 2 comes into being constrained for the length expansion on the putting into operation. The springs 9 of the bearing 7 follow this upward movement.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Device for supporting a horizontal, thermally loaded container, comprising: first and second bearings and first and second support brackets, said container resting on said bearings through said support brackets; said bearings being independently spaced from each other; said first support bracket being in said first bearing and guided for vertical and horizontal displacement; said second bearing comprising hinged supports inclined relative to the longitudinal axis of the container and pivotable in direction of the longitudinal axis of the container, said hinged supports having joints at two ends and being substantially free of deformation, extension of said container in horizontal direction from thermal effects moving said hinged supports toward vertical direction and lifting thereby the container, the longitudinal axis of said container remaining horizontal after extension of said container from thermal effects and being lifted only by a predetermined amount; inclination of said hinged supports being dependent on vertical displacement corresponding to lifting of said container.

2. Device according to claim 1, wherein said support brackets for said first bearing rest on biassed springs, said springs having a bias which is greater than the proportion of the weight of the container acting on said first bearing.

3. A supporting arrangement for a thermally loaded container, comprising: a support member displaceable vertically under thermal effects from a fixed point, said support member allowing thermal extension of said container in horizontal direction, said support member supporting the weight of said container and following vertical displacement thereof; a first bearing having spring means and being displaceable in horizontal direction; a plate member connected to said container and resting on said spring means, said plate member being vertically displaceable; said spring means having a bias greater than the weight portion of said container acting on said first bearing; a second bearing independently spaced from said first bearing with hinged supports inclined to the longitudinal axis of said container and having joints at both ends, extension of said container in horizontal direction from thermal loading moving said hinged supports toward vertical direction and lifting thereby the container; said bias of said spring means producing an upwardly directed force for following said movement of said hinged supports toward vertical direction by said first bearing, so that the longitudinal axis of said container remains horizontal and is lifted only by a predetermined amount; inclination of said hinged supports being dependent on vertical displacement corresponding to lifting of said container.

4. A supporting arrangement for a thermally loaded container, comprising: a container subject to thermal effects: two pairs of support brackets welded to the exterior of said container; two bearings spaced independently from each other on both sides of said container and supported on a foundation, said support brackets resting on said bearings; one of said bearings having biassed spring means retained between two lateral guides carried slidingly in horizontal direction on a transverse carrier; two vertical supports, said transverse carrier bridging over said vertical supports; plate means movable within said lateral guides, said spring means pressing against said plate means, said spring means having a bias which is greater than the weight portion of said container acting on said one bearing for providing an upwardly directed force; the other one of said bearings comprising a hinged support arranged on both sides of said container, said hinged supports having joints at both ends, one of said joints being provided on said foundation and the other one of said joints resting against the respective support bracket; said hinged supports being inclined relative to the longitudinal axis of said container, and being pivotable in longitudinal direction of said container, extension of said container in horizontal direction from thermal effects moving said hinged supports toward vertical direction and lifting thereby said container; said bias of said spring means producing said upwardly directed force for following said movement of said hinged supports toward vertical direction by said first bearing, so that the longitudinal axis of said container remains horizontal and is lifted only by a predetermined amount; inclination of said hinged supports being dependent on vertical displacement corresponding to lifting of said container.

* * * * *